United States Patent [19]
Cheney et al.

[11] Patent Number: 5,963,222
[45] Date of Patent: Oct. 5, 1999

[54] MULTI-FORMAT REDUCED MEMORY MPEG DECODER WITH HYBRID MEMORY ADDRESS GENERATION

[75] Inventors: Dennis P. Cheney, Vestal; Mark L. Ciacelli, Endicott; Chuck H. Ngai, Endwell, all of N.Y.

[73] Assignee: International Business Machines Corporation, Armonk, N.Y.

[21] Appl. No.: 09/014,896

[22] Filed: Jan. 28, 1998

Related U.S. Application Data

[63] Continuation-in-part of application No. 08/958,632, Oct. 27, 1997.

[51] Int. Cl.⁶ .................................................. G06F 12/06
[52] U.S. Cl. ........................ 345/516; 345/202; 348/403; 348/407
[58] Field of Search ................................ 345/516, 202, 345/501, 203, 515, 513, 517, 521; 382/232, 244–246, 248, 250, 251; 348/402, 403, 405, 407, 413, 416–418, 384, 390, 395, 400, 714

[56] References Cited

U.S. PATENT DOCUMENTS

| | | | |
|---|---|---|---|
| 4,768,083 | 8/1988 | Romesburg | 358/22 |
| 5,153,726 | 10/1992 | Billing | 358/160 |
| 5,170,251 | 12/1992 | Levy | 358/140 |
| 5,170,468 | 12/1992 | Shah et al. | 395/166 |
| 5,208,875 | 5/1993 | Virtue et al. | 382/54 |
| 5,438,361 | 8/1995 | Coleman | 348/208 |
| 5,500,577 | 3/1996 | Kim et al. | 315/364 |
| 5,576,765 | 11/1996 | Cheney et al. | 348/407 |
| 5,774,206 | 6/1998 | Wasserman et al. | 348/403 |
| 5,812,789 | 9/1998 | Diaz et al. | 395/200.77 |

OTHER PUBLICATIONS

IBM "MPEGCS22 Decoder User's Guide", D201167–004, Oct. 31, 1997, Chapters 1–11.

*Primary Examiner*—Kee M. Tung
*Attorney, Agent, or Firm*—Heslin & Rothenberg, P.C.

[57] ABSTRACT

An address generation engine is disclosed for a digital video decoder unit coupled to memory in a digital video decoder system wherein the memory accommodates multi-format and/or reduced video data storage. The address generation engine includes a processor and address generation hardware. The processor, coupled to access encoded data to be decoded by the digital video decoder unit, has microcode for deriving from the encoded data relative location information including a vertical component and a horizontal component. The address generation hardware includes a row address register and a column address register for receiving the vertical component and horizontal component, respectively, derived by the processor. The address generation hardware is configured for generating from the vertical component and the horizontal component either a macroblock write address for writing a reconstructed macroblock of data to memory, a motion compensation read address for accessing pertinent motion vector information of the encoded data for reconstructing the macroblock, and a pan and scan offset address usable by a display unit for displaying reconstructed video data in pan and scan format.

28 Claims, 7 Drawing Sheets

4
MULTI-FORMAT REDUCED MEMORY MPEG DECODER WITH HYBRID MEMORY ADDRESS GENERATION

CROSS-REFERENCE TO RELATED APPLICATIONS

This application comprises a continuation-in-part patent application from commonly assigned, co-pending U.S. patent application by Cheney et al. entitled "Multi-Format Reduced Memory MPEG-2 Compliant Decoder," Ser. No. 08/958,632 Oct. 27, 1997, the entirety of which is hereby incorporated herein by reference. Further, this application is related to commonly assigned, co-pending U.S. patent application by Buerkle et al., entitled "Compression/Decompression Engine For Enhanced Memory Storage In MPEG Decoder," Ser. No. 08/971,438, which is also hereby incorporated herein by reference in its entirety.

TECHNICAL FIELD

The present invention relates generally to digital video signal processing, and more particularly, to a hybrid software and hardware addressing of external memory in a video decoder system allowing multi-format and decimated data storage in memory.

BACKGROUND OF THE INVENTION

Several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiberoptic networks, as well as broadcast terrestrially and other direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG Committee has been developing standards for the multiplexed, compressed representation of video and associated audio signals.

The MPEG-2 standard describes an encoding method that results in substantial bandwidth reduction by a subjective lossy compression followed by a lossless compression. The encoded, compressed digital data is subsequently decompressed and decoded in an MPEG-2 compliant decoder. The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, the assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block-based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

Video decoding in accordance with the MPEG-2 standard is described in greater detail in commonly assigned United States Letters Patent No. 5,576,765, entitled "Video Decoder" which is hereby incorporated herein by reference in its entirety.

Video decoders are typically embodied as general or special purpose processors and memory. For a conventional MPEG-2 decoder, two decoded reference frames are typically stored in memory at the same time. Thus, the cost of memory can often dominate the cost of the decode system. For example, an MPEG-2 video decoder might employ 2 MB or more of external memory, which generally comprises Dynamic Random Access Memory (DRAM). External memory is used for various data areas, or buffers such as frame buffers.

In practice, the MPEG-2 video decoder is typically limited to 2 MB of external memory in order to minimize cost of the end product. The decoder must perform all of its functions within this limitation. For example, of particular importance is enabling output for both the European market which utilizes the PAL standard of 576 video scan lines and the U.S. market which utilizes the NTSC standard of 480 video scan lines.

The MPEG-2 decompressed video data buffers, also called frame buffers, consume the largest part of external DRAM, therefore they are a prime candidate for memory reduction/compression. However, because the frame buffers contain final pixel display and MPEG reference data, any storage reduction technique must retain high video fidelity in the frame buffers.

Another obstacle faced in video compression/decompression is being able to transform pictures between different sized screens. For example, a motion picture screen is in 16:9 format, while a television screen is in 4:3 format. As a result, a method must be provided to convert between 16:9 and 4:3 form factors. This need is discussed in the above-incorporated, pending U.S. Application entitled "Multi-Format Reduced Memory MPEG-2 Compliant Decoder," which is described further herein.

In view of the above, and in order to establish commercial advantage, an enhanced technique for a digital video decoder is desired for generating read and write addresses to external memory allowing multi-format and reduced video data storage. The present invention addresses this need.

DISCLOSURE OF THE INVENTION

Briefly summarized, the invention comprises in one aspect an address generation engine for a digital video decoder unit coupled to memory. The address generation engine includes a processor and address generation hardware. The processor is coupled to access an encoded video signal to be decoded by the digital video decoder unit, and includes microcode for deriving from the encoded video signal relative location information, including a vertical component and a horizontal component. The address generation hardware includes a row address register and a column address register for receiving the vertical component and the horizontal component, respectively, of the relative location information derived by the processor. The address generation hardware is coupled to and initiated by the processor and is configured to generate from the vertical component and the horizontal component at least one of a macroblock write address, a motion compensation read address, and a pan and scan offset address. Thus, the macroblock write address, the motion compensation read address and/or the pan and scan offset address is generated in hybrid fashion using the microcode of the processor and the address generation hardware.

In another aspect, the invention comprises a digital video decoder system for decoding an encoded digital video signal. The system includes: a memory and a memory controller for temporarily storing the encoded digital video signal; a variable length code (VLC) decoder coupled to the memory for decoding encoded data of the encoded digital video signal, thereby producing decoded data; an inverse quantizer (IQ) coupled to the VLC decoder for dequantizing the decoded data to produce therefrom dequantized, decoded data; a discrete cosine transform inverter (IDCT) coupled to the IQ for transforming the dequantized, decoded data from frequency domain to spatial domain, the spatial domain, dequantized decoded data including difference data; a motion compensator (MC) and adder for receiving reference data from the memory and the difference data from the IDCT to form motion compensated pictures therefrom; and a hybrid address generation engine coupled to the MC and to a display unit of the digital video decoder system for providing addressing to the memory. The hybrid address generation engine includes a processor and address generation hardware. The processor is coupled to access the encoded data to be decoded and has microcode for deriving therefrom relative location information including a vertical component and a horizontal component. The address generation hardware includes a row address register and a column address register for receiving the vertical component and the horizontal component, respectively, determined by the processor. The address generation hardware is coupled to and initiated by the processor and is configured to generate from the vertical component and the horizontal component at least one of a macroblock write address, a motion compensation address and a pan and scan offset address, whereby the at least one of the macroblock write address, the motion compensation read address and the pan and scan offset address is generated in hybrid fashion via the microcode of the processor and the address generation hardware.

In still another aspect, the invention comprises a hybrid address generation method for use within a digital video decoder unit of a digital video decoder system for addressing memory of the decoder system. The method includes: using microcode, of a processor coupled to access encoded data to be decoded by the digital video decoder unit, to generate from the data relative location information including a vertical component and a horizontal component; and using address generation hardware to generate from the vertical component and the horizontal component at least one of a macroblock write address, a motion compensation read address, and a pan and scan offset address, wherein the at least one of the macroblock write address, the motion compensation read address and the pan and scan offset address is generated in hybrid fashion using the microcode of the processor and the address generation hardware.

In all aspects, the present invention comprises a practical technique for generating external memory addresses for a digital video decoder. Instead of using microcode to generate all memory addresses, microcode is employed to set up initial values, for example, relative row address and column address values, which are then sent to address generation hardware to generate the desired write or read addresses. This hybrid approach reduces design complexity in the hardware and saves silicon area compared with an all microcode implementation, which would require increased instruction store size. The area for the added hardware to do address generation in this hybrid manner is much smaller than the area otherwise required for the instruction store to do all microcode addressing, that is assuming that performance was not an issue. Performance is significantly enhanced using hybrid address generation in accordance with this invention since the hardware address generation unit allows the microcode to move on to a next task once the hardware unit is initiated by the microcode. This enhanced performance will allow the decoder to run at a lower clock speed, and thereby at reduced power.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As the present invention may be applied in connection with an MPEG-2 decoder, in order to facilitate an understanding of the invention, some pertinent aspects of the MPEG-2 compression algorithm are first reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or non-interlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
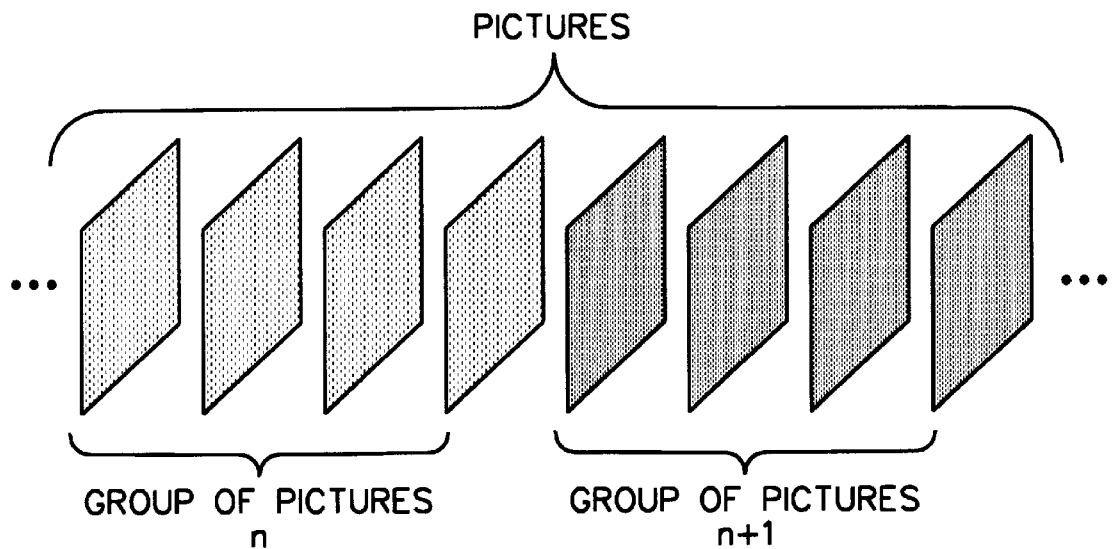
FIG. 1 shows an exemplary pair of Groups Of Pictures (GOPs)
Figure 2:
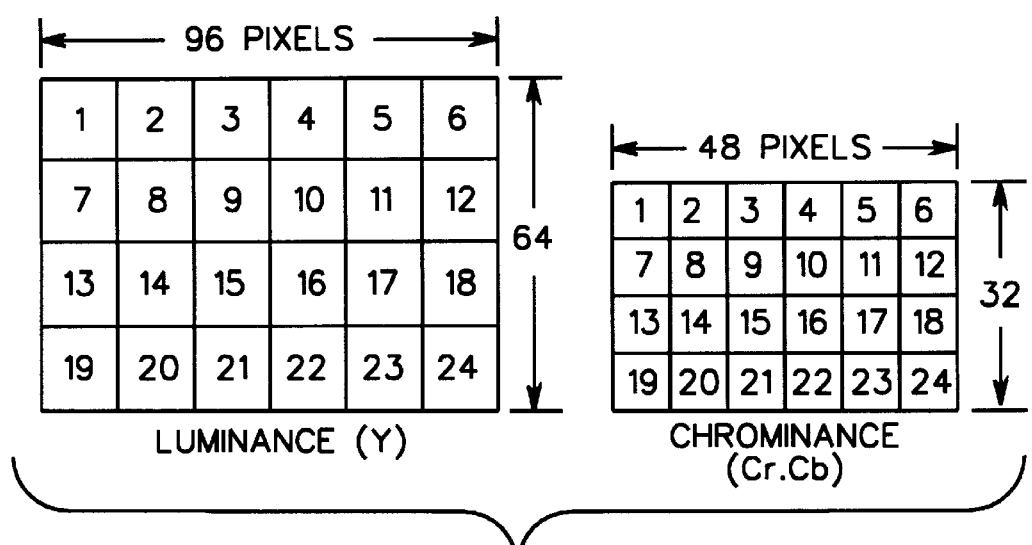
FIG. 2 shows an exemplary macroblock (MB) subdivision of a picture (for 4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1 & 2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOPs. There is no limit to the number of pictures which may be in a GOP, nor do there have to be equal numbers of pictures in all GOPs.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field, and the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as I pictures, the first field can be coded as an I picture and the second field as a P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by cmn, where m and n can range from 0 to 7, aside from truncation or rounding corrections, quantization is achieved by dividing each DCT coefficient cmn by wmn times QP, with wmn being a weighting factor and QP being the quantizer parameter. The weighting factor wmn allows coarser quantization to be applied to the less visually significant coefficients. The quantizer parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description is needed here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Because I and P pictures are used as references to reconstruct other pictures (B and P pictures) they are called reference pictures. Because two reference frames are needed to reconstruct B frames, MPEG-2 decoders typically store two decoded reference frames in memory.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 3:
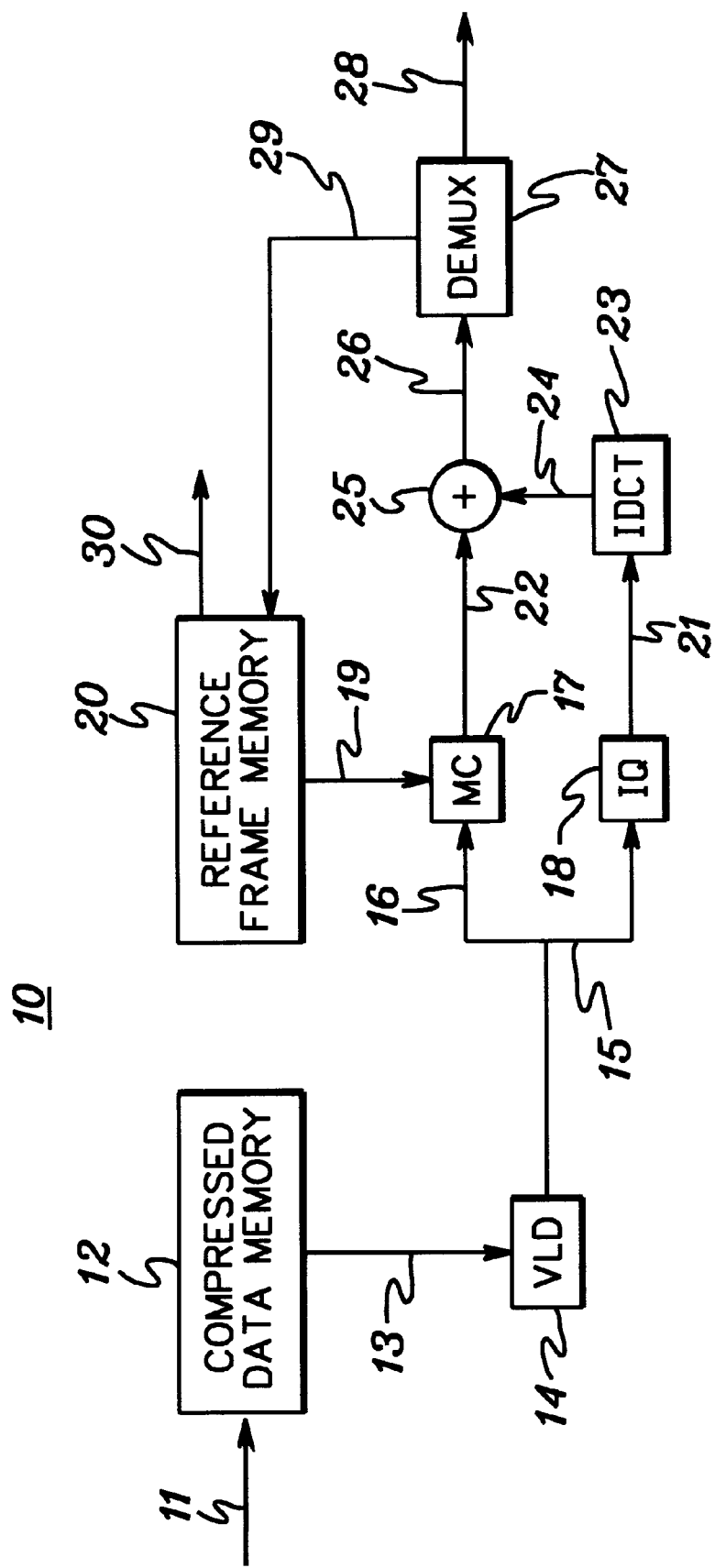
FIG. 3 depicts a block diagram of a video decoder.

FIG. 3 shows a diagram of a conventional video decoder. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as the signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Various techniques have been proposed for reducing memory requirements of a decode system by storing decoded video data in compressed form. One such technique is described in the above-incorporated pending patent application entitled "Multi-Format Reduced Memory MPEG-2 Compliant Decoder," Ser. No. 08/958,632. This co-pending application relates to a method for reducing memory requirements for frame buffer storage for an MPEG-2 decoder, and to editing or modifying the video output, e.g., from a 4:3 form factor of television to a 16:9 format of motion pictures. A significant aspect of the technique is decimation of the B-coded pictures within software of the video decoder. This technique includes first motion compensating the P-coded and B-coded pictures, followed by decimating the B-coded pictures during the decode phase, and increasing the size of scan line fetches for the I-coded and P-coded pictures to enable their horizontal decimation during the display phase. The present invention is directed to a hybrid address generation technique designed to enhance performance of a digital video decoding system as described in this co-pending application.

Another compression/decompression engine for enhanced memory storage in MPEG decoders is described in the above-incorporated co-pending U.S. patent application Ser. No. 08/971,438. This particular technique implements a method for reducing memory requirements of a conventional decoding system such as described in commonly assigned U.S. patent application Ser. No. 08/599,695 filed by Linzer et al. on Feb. 9, 1996, entitled "Approximate MPEG Decoder With Compressed Reference Frames," the entirety of which is hereby incorporated herein by reference. In patent application Ser. No. 08/971,438, a reference picture in a sequence is decoded in the video decoder, then compressed in a compression/decompression unit external to the video decoder before storage in the external memory, i.e., the frame buffers. When a reference frame is needed for motion compensation, the frame is retrieved from external memory and then decompressed prior to transfer to the motion compensation unit.

Figure 4:
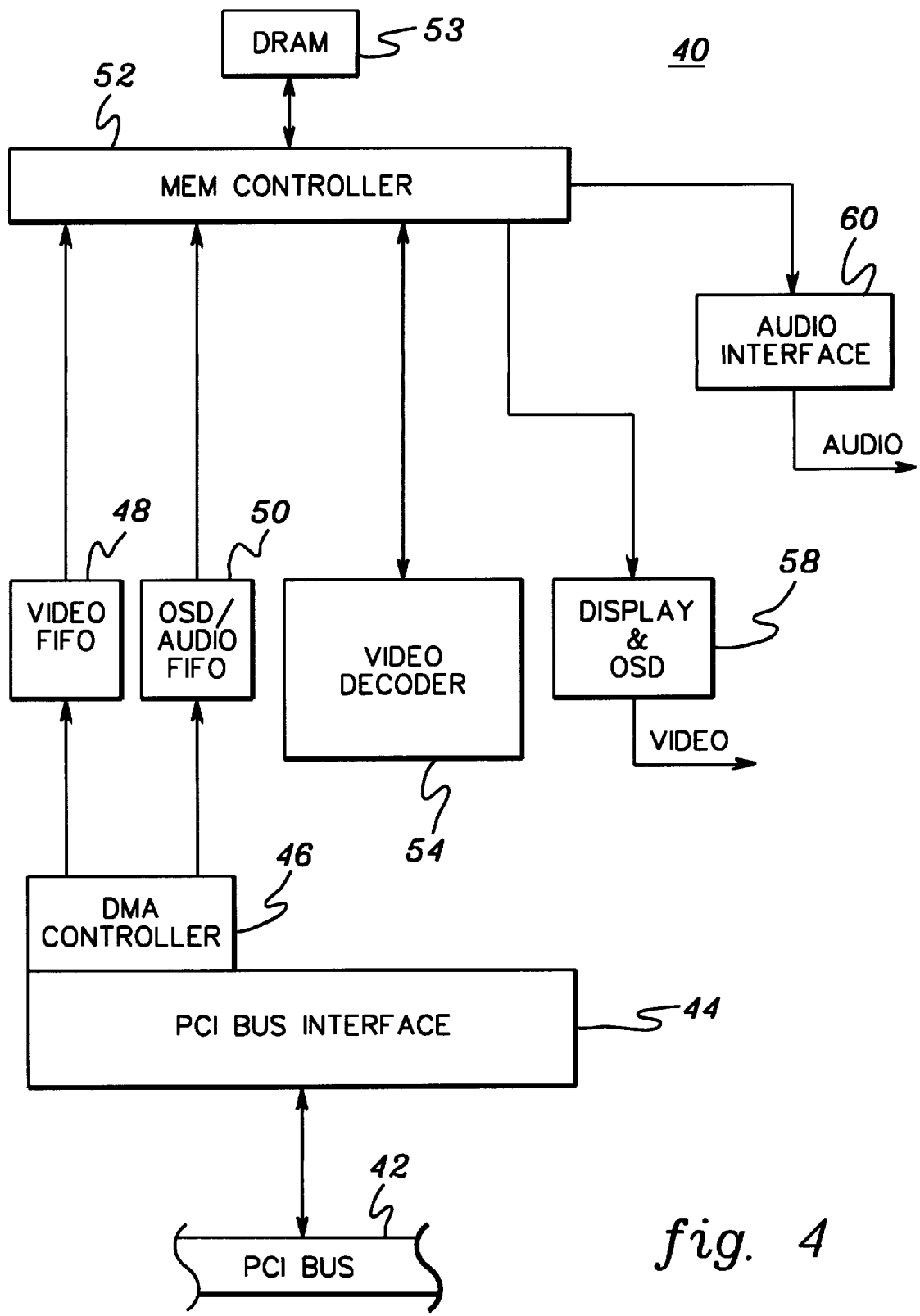
FIG. 4 is a block diagram of a video decoding system to employ the principles of the present invention.

A decode system, generally denoted 40, to employ the present invention is depicted in FIG. 4. System 40 includes a PCI bus interface 44 which couples the decode system 40 to a PCI bus 42. MPEG encoded video data is fetched from PCI bus 42 by a DMA controller 46 which writes the data to a video First-In/First-Out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 3. Conventionally, the decoded video data is then stored back into the frame buffers of DRAM 53 for subsequent use as already described. When a reference frame is needed, or when video data is to be output from the decode system, stored data in DRAM 53 is retrieved by the MEM controller and forwarded for output via a display & OSD interface 58. Audio data, also retrieved by the memory controller 52, is output through an audio interface 60.

Generally stated, this invention comprises an enhanced implementation for generating within video decoder 54 memory addresses for proper communication of video data between video decoder 54 and DRAM 53, which is assumed to accommodate multi-format, reduced scale video data.

Figure 5:
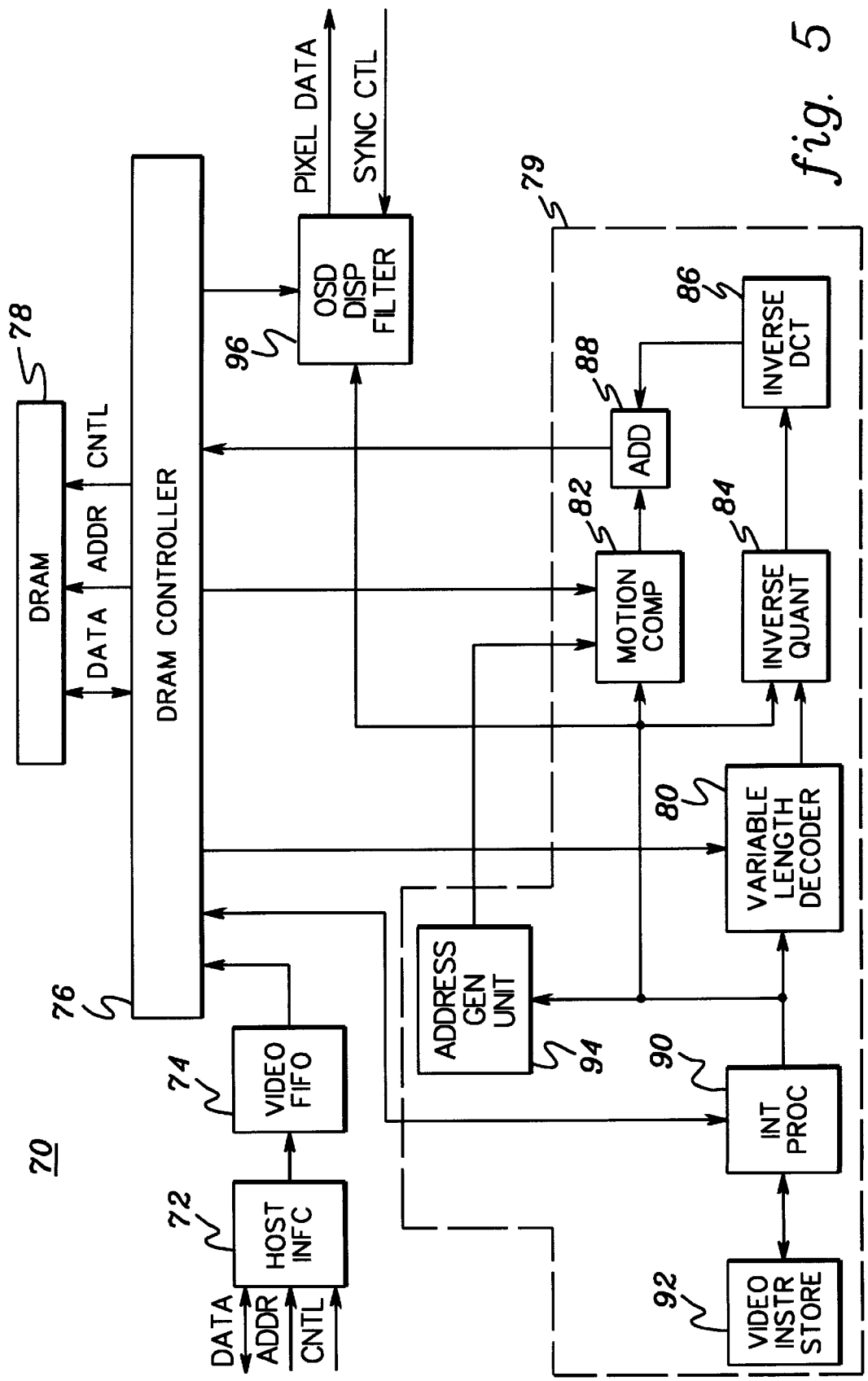
FIG. 5 is a partial block diagram of the video decoding system of FIG. 4 employing hybrid address generation in accordance with the principles of the present invention.

FIG. 5 depicts another embodiment of a decode system, generally denoted 70, in accordance with the principles of this invention. System 70 includes a host or PCI bus interface 72 which couples the decode system 70 to a PCI bus (not shown). MPEG encoded video data is fetched from the PCI bus and written to a video first-in/first-out (FIFO) buffer 74. DRAM controller 76 then places video data into a correct memory buffer within Dynamic Random Access Memory (DRAM) 78.

MPEG compressed video data is retrieved by the video decoder 79 and decoded in a manner as described above. Briefly summarized, compressed data is read by variable length decoder 80 from DRAM 78, then decoded and passed to inverse quantizer 84. In parallel, the motion compensation unit 82 reads the reference data from the reference frame memory to form the predicted macroblock, which is sent to an add unit 88. The inverse quantization unit computes the unquantized coefficients, and forwards them to the inverse transform (IDCT) unit 86. The inverse transform unit computes a reconstructed difference macroblock as the inverse transform of the unquantized coefficients. The reconstructed difference macroblock is sent to add unit 88, where it is added to the predicted macroblock. The adder computes the reconstructed macroblock as the sum of the reconstructed difference macroblock and predicted macroblock. The reconstructed macroblock is then sent to DRAM controller 76 for storage to the reference memory if the macroblock comes from a reference picture or sends it out to an OSD display filter 96 for display of pixel data.

Conventionally, addressing to external memory requires macroblock write and motion compensation read addresses for each macroblock. In the MPEG standard, the motion compensation unit of the decoder (decompression) needs to access the memory to execute every macroblock of the picture. Typically, these addresses are generated by the decoder microcode. As the video decoder continues to mature, additional functions/features continue to be added. For example, in current decoders, a letterbox display format with horizontal compression option may be included. Also, the 4:2:2 and 4:2:0 chrominance formats need to be supported. The letterbox and compression options create significant complexity for the microcode to handle the address calculation. This complexity will ultimately degrade decoder performance due to the added time needed to do the various tests required in order to calculate an address. The performance issue is critical since the decoder must complete a picture in one picture time. Also, the number of instructions to do an address calculation continues to increase. This increase impacts on chip size since the instructions are typically stored on chip.

Thus, in accordance with the present invention, an internal processor 90 uses microcode stored in video instruction store 92 to set up certain initial values for a hardware address generation unit 94 to then generate the necessary memory addresses for the video decoder 79. This hybrid approach to address generation reduces design complexity otherwise necessary for a complete hardware implementation, and saves silicon area by not increasing the instruction store size otherwise needed for a complete software implementation. The added hardware necessary to do address generation is much smaller than the required instruction store space to accommodate the microcode. Further, enhanced performance is attained by a hybrid approach which allows the microcode to move on to a next task once the hardware unit is initiated by the microcode. This added performance may allow the decoder to run at a lower clock speed, thereby reducing power requirements of the decode system.

In accordance with the principles of this invention, address generation unit 94 has the ability to generate the macroblock write address and the motion compensation read addresses, as well as the pan and scan offset address. The macroblock write address is the address for the constructed macroblock to be stored in memory. As noted, a macroblock is defined as a 16-pixel by 16-pixel square. Each pixel has one byte of luminance and one byte of chrominance of either Cr or Cb in the 4:2:0 format. A picture of 720×480 pixels will have 45 macroblocks in the horizontal dimension and 30 macroblocks in the vertical dimension. The picture is stored in memory in a raster format such that a line of 720 pixels is followed by the next line. The luminance and the chrominance are stored in separate regions.

The macroblock write address is the address for the upper left corner of each macroblock. Each macroblock is processed one at a time from left to right and top to bottom. Each macroblock will need one write address.

The read address is more complicated since it is the reference picture address used for the prediction to reconstruct the macroblock. The address does not follow the 16-pixel grid. It can be anywhere inside the picture. The idea is to allow the motion estimator to find the best match from the reference picture to minimize the data transmission. The motion vectors from the bitstream provide the information to determine the offset from the macroblock origin, which is the write address. From there, the read address is calculated from the vertical and horizontal offsets. The offsets can be positive or negative. If the prediction is between two pixels, then the address must be modified to fetch one more pixel to perform an interpolation. This can occur in both vertical and horizontal directions as discussed further below.

In addition to the intra-picture interpolation, there is inter-picture interpolation. This involves interpolating a macroblock in the forward (past) picture with a macroblock in the backward (future) picture. The offset of the macroblock in each picture is determined by its motion vectors. But the address calculation is the same to the address generation unit. The result is stored in two different registers, herein referred to as the row address register and the column address register.

The last function supported by the address generation unit 94 is the pan and scan offset address calculation. This address tells the display unit where to begin each picture. The pan and scan vectors which are in the input video stream can change the starting address on each picture.

Microcode Setup

Before hardware execution can take place, the microcode performs initial calculations to set the proper values in the registers for the hardware to use. The reason for these initial calculations is to eliminate the need of a multiplier in the hardware unit since the internal processor already has the multiply function.

The two registers are defined as the following.

ROW_ADDR (16 bits)

For write address generation =(SLICE−1)*HSIZE (in units of 16)

For read address generation =VERT_COMP*HSIZE (2's comp in units of 16)

or pan and scan address generation =VERT_OFFSET*HSIZE (in units of 16)

COL_ADDR (16 bits)

For write address generation =MB_COL (in macroblock units)

For read address generation =HOR_COMP (2's comp in pixel units)

For pan and scan address generation =HOR_OFFSET (in pixel units)

Wherein HSIZE comprises the horizontal size and VERT_COMP and HOR_COMP comprise the vertical component and horizontal component, respectively, of the current motion vector. SLICE is the vertical position of the current macroblock, and MB_COL is the horizontal position of the current macroblock. VERT_OFFSET and HOR_OFFSET are the vertical and horizontal components, respectively, of the PAN_SCAN display vector.

In addition to the two registers for the input values, a command register is needed in the hardware to control the address execution. The 'execute' bit tells the hardware to execute the command specified in the address generation control field. After the command is completed, the 'execute' bit is reset to '0' by the hardware.

COMMAND (4 bits)

Bit 3—Execute

0—no action or execution complete

1—execute address generation

Bits 2-0 —Address Generation Control

001 —generate luma and pan offset addresses

010 —generate luma and chroma write offset addresses

100 —generate luma and chroma fwd MV1 offset addresses

101 —generate luma and chroma fwd MV2 offset addresses

110 —generate luma and chroma bwd MV1 offset addresses

111 —generate luma and chroma bwd MV2 offset addresses

In the write address generation command execution (bits 2-0='010'), the hardware expects the microcode to multiply the number of macroblock rows with the horizontal size (HSIZE). Since the HSIZE is dictated by MPEG standard to be a multiple of 16, the row address value does not have to carry the low order four zeros. Further, since each row of a macroblock has 16 lines of pixels, the hardware must multiply the row address by 256 by shifting the value left 8 bit positions. This will produce the starting address of the macroblock row. The column address is in units of 16 because each macroblock is 16×16. Thus, the column address is left shifted by 4 bit positions and then added to the shifted row address to form the macroblock write address.

When the picture is a field picture, the macroblock contains the data of the same field. The frame buffer in the memory is structured in frames which interleave two fields. The macroblock containing the field picture data will span across 32 pixel lines. The memory address must consider that for each macroblock row, the multiply factor of 256 mentioned above becomes 512 for field pictures.

The address generation also supports the memory reduction for B-pictures. There are three types of pictures, I, P and B, in the MPEG standard. The I-picture is called the 'Intra' picture which contains all the picture information. The P-picture contains only the difference between the past picture and the re-constructing picture. The past picture can be the I-picture or the P-picture. Therefore the I and P pictures must be in full size in memory for reference. But the B-picture which is constructed from the past and the future pictures is not used for reference. It can be reduced before it is stored in the memory. The reduction is preferably done through decimation as described in the initially incorporated application entitled "Multi-Format Reduced Memory MPEG-2 Compliant Decoder," Ser. No. 08/958,632. Once retrieved, the decimated image is then expanded for display.

When the memory reduction and/or the letterbox mode is activated, the write address for the B-picture will scale it accordingly. The memory reduction only applies to the horizontal dimension because it is easier and more economical than applying it to the vertical dimension. The column address and the HSIZE are scaled down to generate the reduced memory address. For the letterbox mode, the vertical dimension is decimated. Therefore, the row address must be scaled down by a factor of ¾.

Because the ¾ factor is not a binary number, the result cannot be produced by a single shift. So, as described further below, the ¾ factor is broken pursuant to this invention into ½ and ¼. The result becomes the sum of two shifting outputs, one right shift by 1 and another right shift by 2.

For the reference read address generation, the row and column addresses are used differently. The MPEG standard requires the decoder to read a macroblock of data from the previous picture with an offset from the address of the macroblock being reconstructed. The offset is indicated by the motion vectors. Because the motion vectors in MPEG can be in half-pel accuracy, vertical interpolation between two adjacent macroblock lines and/or horizontal interpolation between two horizontal pixels may be required. This may require one or more pixel lines to be fetched beyond the top of a macroblock or one or more pixels from the left of a macroblock. Of course, this requirement makes the calculation complicated. The microcode sets up the row address to be the product of the HSIZE and the number of pixel lines above or below the constructing macroblock in two's complement. Since the HSIZE is always a multiple of 16, the row address value is in units of 16. The column address is set to the number of pixels to the left or right of the macroblock being constructed in two's complement. When the macroblock write address is first generated, a macroblock base address is also generated. The hardware left shifts the row address by 4 bit positions to get the true row address. The row address, the column address and the base address are added together to generate the reference read address.

As noted above, the four control commands '100', '1101', '110' and '111' are used to generate the reference read address. Address generation operations from these four commands are the same except that each result is loaded into a different register. The '100' command is used to generate the reference read address for the forward motion vector 1, and the '101' command is used to generate the reference read address of the forward motion vector 2. The '110' command is used to generate the reference read address of the backward motion vector 1, while the '111' command is for generating the reference read address of the backward motion vector 2.

The pan and scan offset address generation produces an address for the upper left corner of an image to be displayed from the frame buffer. The row address is set by the microcode to indicate how many lines of pixels from the top of the picture to start displaying. The column address indicates how many pixels from the left edge of the picture. Since the row address is in units of 16, it requires a left shift of 4 bit positions to restore the real value. The column address is added to the restored row address to produce the pan and scan offset address. For a B-picture, the pan and scan address must follow the same reduction scaling used in the write address generation.

Address Generation Equations

The following equations depict one embodiment for scaling of each component before the addition. These equations assume that the B-picture is stored in frame structure in memory. The B-picture frame buffer provides a tempory buffer for the decode process and the display. The display uses the data produced by the decoding exactly one field time later. The decode process will use the memory space as soon as it is freed up by the display. Letterbox mode and picture size reduction are also supported in the equations set forth below.

Write Address Generation $$\text{LUMINANCE} = \left[ \left[ \begin{array}{c} \text{ROW\_ADDR} \end{array} \right] * \left[ \begin{array}{c} 256\,(\text{frame}) \\ 512\,(\text{field}) \end{array} \right] * \left[ \begin{array}{cl} 1.00 & (\text{if normal}) \\ .75 & (\text{if LB}-3/4) \\ .50 & (\text{if } 1/2) \\ .25 & (\text{if } 1/4) \end{array} \right] * \left[ .50\,(\text{if Y}-\text{red}) \right] \right] +$$

$$\left[ \left[ \begin{array}{c} \text{COL\_ADDR} \end{array} \right] * \left[ 16 \right] * \left[ \begin{array}{cl} 1.00 & (\text{if normal}) \\ .50 & (\text{if Y}-\text{Red}) \\ .50 & (\text{if } 1/2) \\ .25 & (\text{if } 1/4) \end{array} \right] \right] +$$

$$\left[ \left[ \begin{array}{c} \text{HSIZE (if} \\ \text{bot\_field} \\ \&\ \text{int)} \end{array} \right] * \left[ 1 \right] * \left[ \begin{array}{cl} 1.00 & (\text{if normal}) \\ .50 & (\text{if Y}-\text{Red}) \\ .50 & (\text{if } 1/2) \\ .25 & (\text{if } 1/4) \end{array} \right] \right]$$

Column headers: REGISTER | CONTENT SCALING | DECIMATION SCALING 420 B Only | Fullsize, LB – 3/4 Only $$\text{CHROMINANCE} = \left[ \left[ \begin{array}{c} \text{ROW\_ADDR} \end{array} \right] * \left[ \begin{array}{c} 128/256\,(\text{frame}) \\ 256/512\,(\text{field}) \end{array} \right] * \left[ \begin{array}{cl} 1.00 & (\text{if } \neg\ 1/4) \\ .50 & (\text{if } 1/4) \end{array} \right] * \left[ .50\,(\text{if Y}-\text{red}) \right] \right] +$$

$$\left[ \left[ \begin{array}{c} \text{COL\_ADDR} \end{array} \right] * \left[ 16 \right] * \left[ \begin{array}{cl} 1.00 & (\text{if normal}) \\ .50 & (\text{if UV}-\text{Red}) \\ .50 & (\text{if } 1/2) \\ .25 & (\text{if } 1/4) \end{array} \right] \right] +$$

$$\left[ \left[ \begin{array}{c} \text{HSIZE (if} \\ \text{bot\_field} \\ \&\ \text{int)} \end{array} \right] * \left[ 1 \right] * \left[ \begin{array}{cl} 1.00 & (\text{if normal}) \\ .50 & (\text{if UV}-\text{Red}) \\ .50 & (\text{if } 1/2) \\ .25 & (\text{if } 1/4) \end{array} \right] \right]$$

Column headers: REGISTER | CONTENT SCALING 420/422 | DECIMATION SCALING 420 B Only | Fullsize, LB – 3/4 Only Wherein:

LB-¾=letterbox or ¾ reduction on vertical dimension

½=½ reduction on both horizontal and vertical dimensions

¼=¼ reduction on both horizontal and vertical dimensions

Y-Red =½ reduction on horizontal for luminance

UV-Red =½ reduction on horizontal for chrominance.

*Pan and Scan Offset Generation*

$$\text{LUMINANCE} = \left[ \left[ \text{ROW\_ADDR} \right] * \begin{bmatrix} \text{CONTENT} \\ \text{SCALING} \\ 16 \end{bmatrix} * \begin{bmatrix} \text{DECIMATIONSCALING} \\ 420\ B\ \text{Only} \\ 1.00 & (\text{if normal}) \\ .75 & (\text{if } LB-3/4) \\ .50 & (\text{if } 1/2) \\ .25 & (\text{if } 1/4) \end{bmatrix} \right] + \left[ [\text{COL\_ADDR}] * [1] \right]$$

$$\text{CHROMINANCE} = \left[ \left[ \text{ROW\_ADDR} \right] * \begin{bmatrix} \text{CONTENT} \\ \text{SCALING} \\ 16 & (422) \\ 8 & (420) \end{bmatrix} * \begin{bmatrix} \text{DECIMATION SCALING} \\ 420\ B\ \text{Only} \\ 1.00 & (\text{if } \neg 1/4) \\ .50 & (\text{if } 1/4) \end{bmatrix} \right] + \left[ [\text{COL\_ADDR}] * [1] \right]$$

*Reference Read Address Generation*

$$\begin{array}{l} \text{LUMINANCE} \\ \text{MB BASE ADDRESS} \end{array} = \left[ \left[ \text{ROW\_ADDR} \right] * \begin{bmatrix} \text{CONTENT} \\ \text{SCALING} \\ 256 & (\text{frame}) \\ 512 & (\text{field}) \end{bmatrix} \right] + \left[ [\text{COL\_ADDR}] * [16] \right] + \left[ \left[ \begin{array}{c} HSIZE\ (\text{if} \\ bot\_field \\ \&\ int) \end{array} \right] * [1] \right]$$

$$\begin{array}{l} \text{CHROMINANCE} \\ \text{MB BASE ADDRESS} \end{array} = \left[ \left[ \text{ROW\_ADDR} \right] * \begin{bmatrix} \text{CONTENT} \\ \text{SCALING} \\ 420/422 \\ 128/256 & (\text{frame}) \\ 256/512 & (\text{field}) \end{bmatrix} \right] + \left[ [\text{COL\_ADDR}] * [16] \right] + \left[ \begin{array}{c} HSIZE\ (\text{if} \\ bot\_field \\ \&\ int) \end{array} * [1] \right]$$

$$\begin{array}{l} \text{LUMINANCE} \\ \text{REFERENCE READ} \end{array} = \left[ ROW\_ADDR * 16 \right] + [COL\_ADDR] + \left[ \begin{array}{c} \text{LUMINANCE} \\ \text{MB BASE ADDR} \end{array} \right] +/- [HSIZE\ ADJ.]$$

$$\begin{array}{l} \text{CHROMINANCE} \\ \text{REFERENCE READ} \end{array} = \left[ \begin{array}{c} ROW\_ADDR * 16\ (\text{if } 422) \\ 8\ (\text{if } 420) \end{array} \right] + \left[ \begin{array}{c} COL\_ADDR \\ (\text{force LSB } 0) \end{array} \right] + \left[ \begin{array}{c} \text{CHROMINANCE} \\ \text{MB BASE ADDR} \end{array} \right] +/- [HSIZE\ ADJ.]$$

Figure 6:
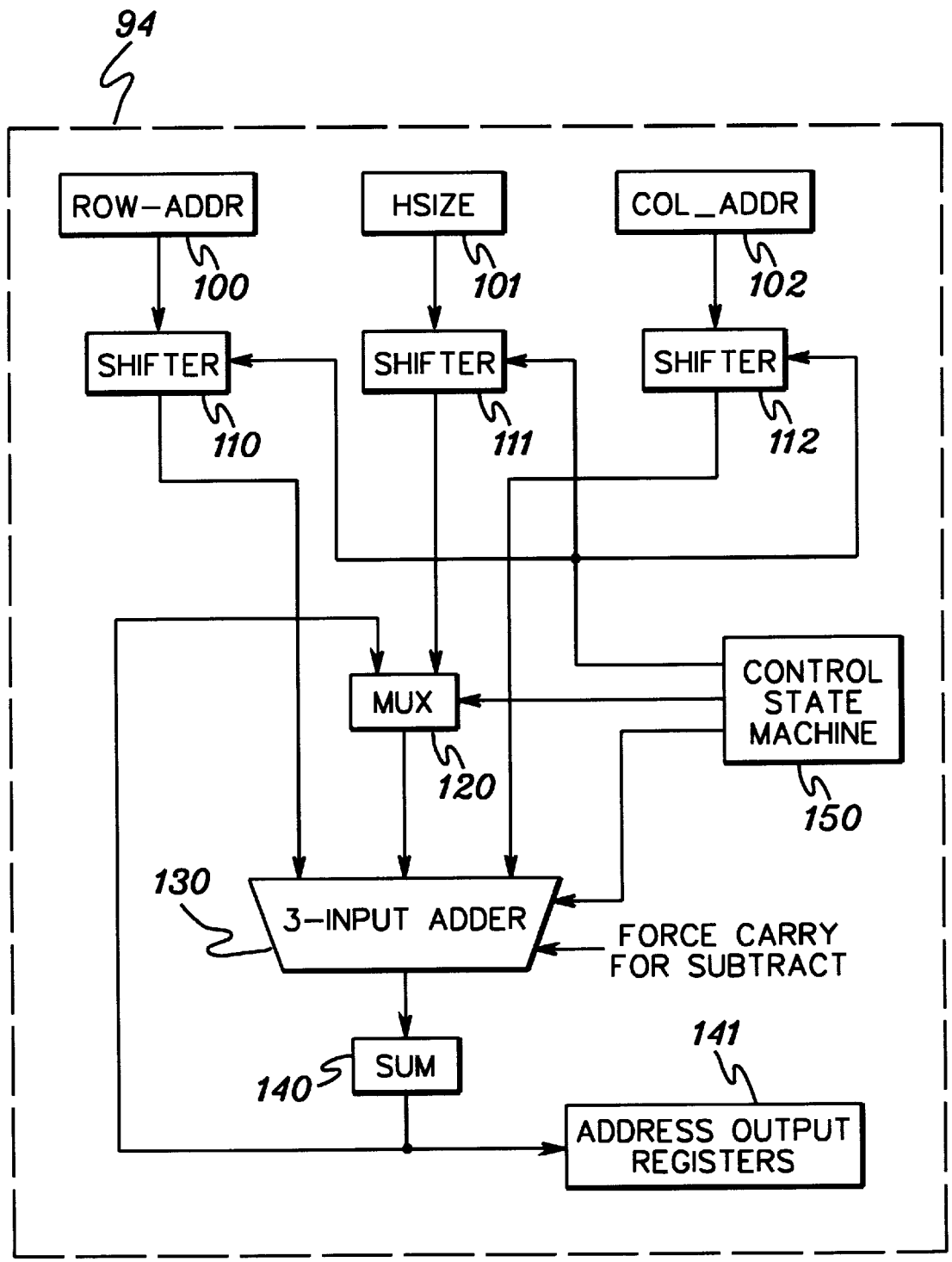
FIG. 6 is a block diagram of one embodiment of the address generation hardware unit of FIG. 5 in accordance with the hybrid addressing scheme of the present invention.

FIG. 6 depicts one embodiment of address gen unit 94 of FIG. 5 implemented in accordance with the principles of this invention. As shown, this address generation hardware includes a row address register 100, an HSIZE register 101 and a column address register 102. Row address register 100 and column address register 102 receive the respective vertical and horizontal components of the relevant location information derived by microcode within the internal processor 90 of the video decoder of FIG. 5 as summarized above. Registers 100, 101, and 102 are coupled across a respective shifter 110, 111 & 112, to an input of a 3-input adder 130. Output from shifter 111 must first pass through a 2-input MUX 120 before being input to adder 130. The second input to MUX 120 comprises a summation output taken from a sum register 140 at the output of adder 130. Output from the address generation hardware is held in address output registers 141 for use as described herein.

Shifters 110, 111 & 112, as well as MUX 120 and adder 130 are controlled by a state machine 150. Machine 150 insures generation of the appropriate address based upon the above-described commands received from the internal processor 90 (FIG. 5). By way of example, the states of control state machine 150 can be expressed as:

For MCU Write Address and MB Base Address Generation:
    State 0 —ROW_ADDR+HSIZE+COL_ADDR (luma intermediate result)
    State 1 —ROW_ADDR+SUM+0 (luma offset address)
    State 2 —ROW_ADDR+HSIZE+COL_ADDR (chroma intermediate result)
    State 3 —ROW_ADDR+SUM+0 (chroma offset address)
    State 4 —ROW_ADDR+HSIZE+COL_ADDR (luma MB base address)
    State 5—ROW_ADDR+HSIZE+COL_ADDR (chroma MB base address)

For Pan Offset Address Generation:
    State 0—ROW_ADDR+0+COL_ADDR (luma intermediate result)
    State 1—ROW_ADDR+SUM+0 (luma offset address)
    State 2—ROW_ADDR+0+COL_ADDR (chroma intermediate result)
    State 3—ROW_ADDR+SUM+0 (chroma offset address)

For MCU Reference Address Generation:
    State 0—ROW_ADDR+LUM_MB_ADDR+COL_ADDR (luma intermediate result)
    State 1—+/−HSIZE+SUM+0 (luma offset address)
    State 2—ROW_ADDR+CHR_MB_ADDR+COL_ADDR (chroma intermediate result)
    State 3—+/−HSIZE+SUM+0 (chroma offset address)

Figure 7:
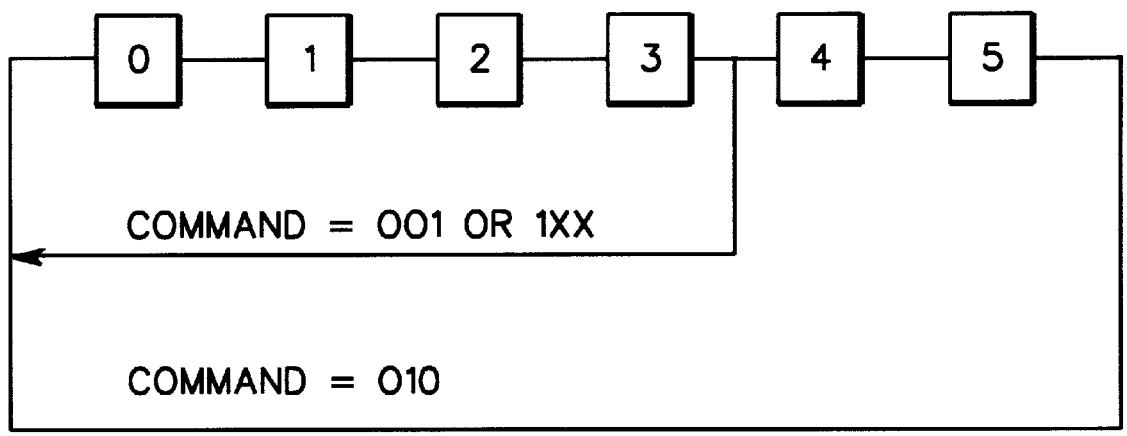
FIG. 7 is one embodiment of a state diagram for the control state machine of the address generation hardware of FIG. 6.

FIG. 7 depicts a state diagram for control state machine 150 having the address generation control states set forth above.

Vertical Dimension Address Calculation

The vertical dimension address or component is set by the microcode into the Row Address register. The value has a different meaning for each address generation command.

For write address generation, the value in the Row Address register is a macroblock row with the HSIZE width. In order to ascertain the memory address, this value must be left shifted by 4 bit positions because each macroblock row has 16 lines of pixels. Further, since the letterbox mode requires ¾ multiplication, this is achieved in hardware by doing two additions of ½ and ¼ multiples. Thus, the state machine is designed to add the Row Address twice. The shifting of the Row Address is shown in the following:

| Luma Row Address | | First Add | Second Add |
|---|---|---|---|
| Frame | 256 * 1 | * 256 | * 0 |
| | 256 * .75 | * 64 | * 128 |
| | 256 * .5 | * 128 | * 0 |
| | 256 * .25 | * 64 | * 0 |
| Frame | 512 * 1 | * 512 | * 0 |
| | 512 * .75 | * 256 | * 128 |
| | 512 * .5 | * 256 | * 0 |
| | 512 * .25 | * 128 | * 0 |
| Chroma Row Address | | First Add | Second Add |
| 420 Frame | 128 * 1 | * 128 | * 0 |
| | 128 * .5 | * 64 | * 0 |
| 420 Field | 256 * 1 | * 256 | * 0 |
| | 256 * .5 | * 128 | * 0 |
| 422 Frame | 256 * 1 | * 256 | * 0 |
| | 256 * .5 | * 128 | * 0 |
| 422 Field | 512 * 1 | * 512 | * 0 |
| | 512 * .5 | * 256 | * 0 |

For pan and scan offset address generation, the Row Address is in terms of pixel lines in units of 16. Thus, the Row Address must be multiplied by 16 before the addition. Although the hardware can handle the vertical offset, typically the Row Address is 0. The shifting of the Row Address is shown in the following:

| Luma Row Address | First Add | Second Add |
|---|---|---|
| 16 * 1 | * 16 | * 0 |
| 16 * .75 | * 8 | * 4 |
| 16 * .5 | * 8 | * 0 |
| 16 * .25 | * 0 | * 4 |
| Chroma Row Address | First Add | Second Add |
| 8 * 1 | * 8 | * 0 |
| 8 * .5 | * 0 | * 4 |
| 16 * 1 | * 16 | * 0 |
| 16 * .5 | * 8 | * 0 |

Horizontal Dimension Address Calculation

The horizontal dimension address or component is set by the microcode into the Column Address register. The value again has a different meaning for each address generation command.

For macroblock write address generation, the value in the Column Address register is a relative macroblock address. In order to ascertain the memory address, this value must be multiplied by 16 since each macroblock has 16 pixels. Also, due to the horizontal reduction and the small picture display capabilities, the horizontal address is scaled according to the display format.

For pan and scan offset address generation, the value in the Column Address register is in terms of pixels. So there is no scaling for the Column Address in the pan offset address generation. The display filter unit will handle the address reduction if it is required.

Reference Read Address Calculation

The reference read address is generated by adding the base address which is generated by the MCU write address command to the motion vector offsets.

Lum Ref Addr = (Row * 16) + Col(interp) + Lum_Base_Addr +/− H_Size (field parity)
Chr Ref Addr = (Row * 8) + Col(interp) + Chr_Base_Addr +/− H_Size +/− H_Size
(field parity) (interp)

The motion vector offsets are transformed into the Row Address and the Column Address by the microcode. The Row Address and Column Address are in terms of pixels and are in 2's complement form. In 4:2:0 mode, the row and column addresses may require adjustment due to the need for interpolation. The row address may add or subtract up to two horizontal lines of pixels. The column address for chroma may add 1 if the motion vector is odd and negative and interpolation is not needed. The relationship of the address and the interpolation is shown in the following:

| | | | | | | | | | | MACROBLOCK ORIGIN ↓ | | | | | | | | | | |
|---|---|---|---|---|---|---|---|---|---|---|---|---|---|---|---|---|---|---|---|---|
| 1/2 PEL | −10 | −9 | −8 | −7 | −6 | −5 | −4 | −3 | −2 | −1 | 0 | 1 | 2 | 3 | 4 | 5 | 6 | 7 | 8 | 9 | 10 |
| COL ADDR | −5 | −5 | −4 | −4 | −3 | −3 | −2 | −2 | −1 | −1 | 0 | 0 | 1 | 1 | 2 | 2 | 3 | 3 | 4 | 4 | 5 |
| CHR COL ADDR | −3 | −2 | −2 | −2 | −2 | −1 | −1 | −1 | −1 | 0 | 0 | 0 | 0 | 0 | 1 | 1 | 1 | 1 | 2 | 2 | 2 |
| INTERPOL | Y | N | N | Y | Y | N | N | Y | Y | N | N | N | Y | Y | N | N | Y | Y | N | N | Y |

Row Address Adjustment

Because the frame buffer is stored in frame structure, the field picture address must be adjusted to fit the addressing scheme. For the field picture write address, one H_Size is added for the bottom field. The H_Size would be scaled for horizontal reduction and size-reduced pictures.

For reference read address generation, the adjustment may come from the field parity or the interpolation or both.

| | |
|---|---|
| Field Parity | Add 1 H_Size if top field and vertical field select = 1. |
| | Sub 1 H_Size if bottom field and vertical field select = 0. |
| Frame Picture Field-base MC | Add 1 H_Size if vertical field select = 1. |
| Dual Prime | Add 1 H_Size if (top field or frame) and (field index = 01 or 10). |
| | Sub 1 H_Size if bottom field and field index = 10. |
| Chroma Interpolation | Add 1 H_Size if no interp and odd motion vector and not frame_frame mode. |
| | Sub 1 H_Size if interp and odd motion vector and not frame_frame mode. |
| | Add 1/2 H_Size if no interp and odd motion vector and frame_frame mode. |
| | Sub 1/2 H_Size if interp and odd notion vector and frame_frame mode. |

All the additions and subtractions of the H_Size are combined in the following table.

| Add H_Size | Sub H_Size | Interp | Odd Mv | not frm_frm mode H_Size Adj | frm_frm mode H_Size Adj |
|---|---|---|---|---|---|
| 0 | 0 | 0 | 0 | 0 | 0 |
| 0 | 0 | 0 | 1 | +1 | +1/2 |
| 0 | 0 | 1 | 0 | 0 | 0 |
| 0 | 0 | 1 | 1 | −1 | −1/2 |
| 0 | 1 | 0 | 0 | −1 | 0 |
| 0 | 1 | 0 | 1 | 0 | 0 |
| 0 | 1 | 1 | 0 | −1 | 0 |
| 0 | 1 | 1 | 1 | −2 | 0 |
| 1 | 0 | 0 | 0 | +1 | 0 |
| 1 | 0 | 0 | 1 | +2 | 0 |
| 1 | 0 | 1 | 0 | +1 | 0 |
| 1 | 0 | 1 | 1 | 0 | 0 |

Figure 8:
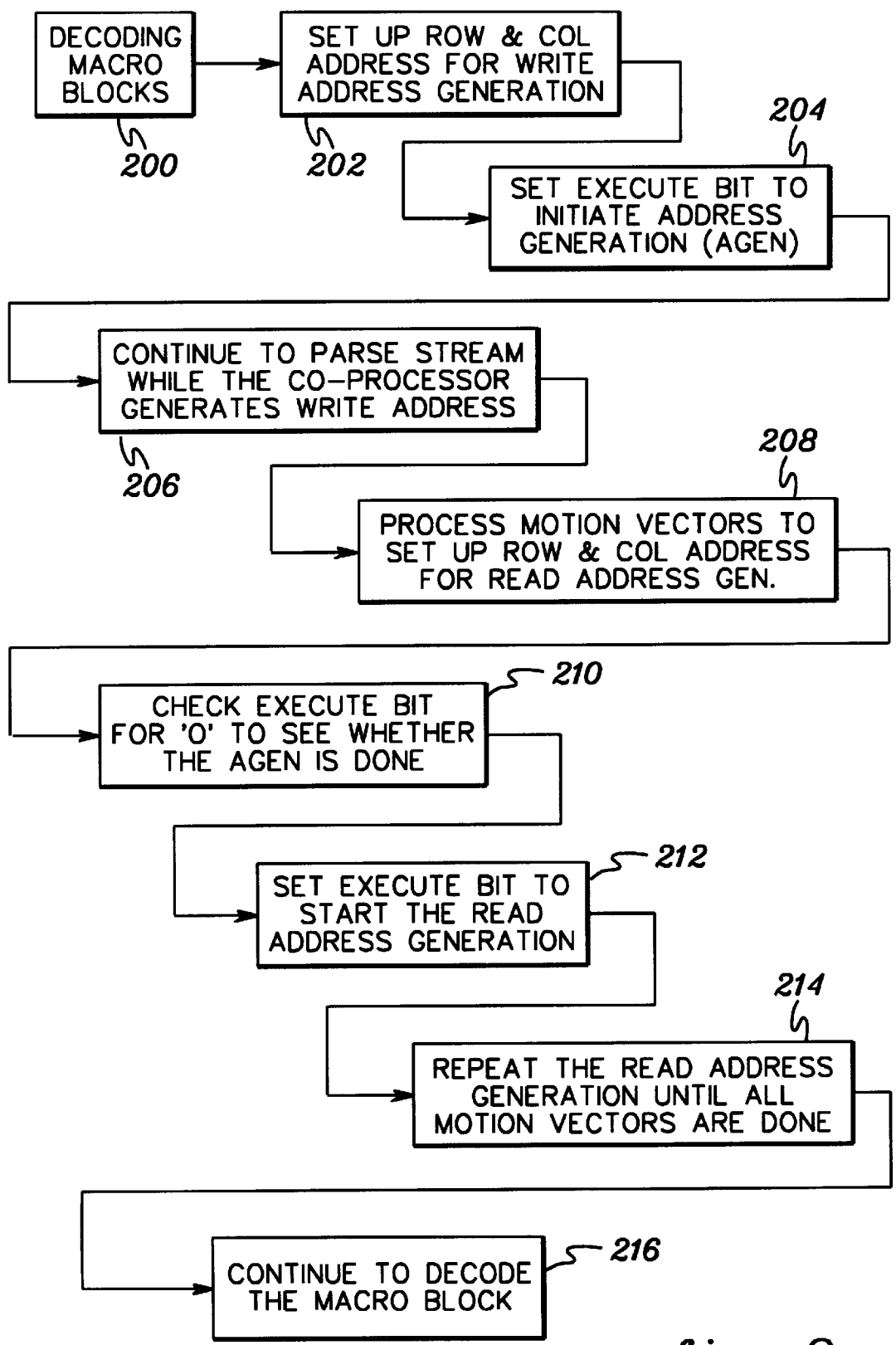
FIG. 8 is flowchart of one embodiment of microcode processing for the internal processor of FIG. 5 for setting up row and column addresses for the address generation hardware in accordance with the principles of the present invention.

One operational embodiment of processor microcode and address generation hardware in accordance with the present invention is depicted in FIG. 8. Decoding of macroblocks 200 begins by setting up the vertical and horizontal components in the row and column addresses for a write address generation 202. The microcode initiates the hardware by setting the execute command bit to initiate address generation (AGEN) 204. Microcode then continues to parse the encoded data stream while the address generation unit generates the write address 206. The microcode processes the relevant motion vectors to set up the vertical and horizontal components in the row and column addresses of the hardware for a read address generation 208. Once the vertical and horizontal components are set for the read address generation, the microcode determines whether the address generation hardware has completed generating the write address 210. If so, then the execute command bit is set to start a read address generation operation within the hardware 212. This process is repeated until the read address is generated for all motion vectors 214. Decoding of the macroblock continues 216 once the write and read addresses have been generated.

To summarize, the present invention comprises a practical technique for generating external memory addresses for a digital video decoder. Instead of using microcode to generate all memory addresses, microcode is employed to set up initial values, for example, relative row address and column address values, which are then sent to address generation hardware to generate the desired write or read addresses. This hybrid approach reduces design complexity in the hardware and saves silicon area compared with an all microcode implementation, which would require increased instruction store size. The area for the added hardware to do address generation in this hybrid manner is much smaller than the area otherwise required for the instruction store to do all microcode addressing, that is assuming that performance was not an issue. Performance is significantly enhanced using hybrid address generation in accordance with this invention since the hardware address generation unit allows the microcode to move on to a next task once the hardware unit is initiated by the microcode. This enhanced performance may allow the decoder to run at a lower clock speed, and thereby at reduced power.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. An address generation engine for a digital video decoder unit coupled to memory, said address generation engine comprising:

a processor coupled to access an encoded video signal to be decoded by said digital video decoder unit, said processor having microcode for deriving from said encoded video signal relative location information including a vertical component and a horizontal component; and address generation hardware including a row address register and a column address register for receiving the vertical component and horizontal component, respectively, of said relative location information derived by said processor, said address generation hardware being coupled to and initiated by said processor and being configured to generate from said vertical component and horizontal component at least one of a macroblock write address, a motion compensation read address, and a pan and scan offset address, wherein said at least one of said macroblock write address, said motion compensation read address and said pan and scan offset address is generated in hybrid fashion using said microcode of said processor and said address generation hardware.

2. The address generation engine of claim 1, wherein said macroblock write address is usable for writing a decoded macroblock of data from said digital video decoder unit to said memory, said motion compensation read address is usable by a motion compensation unit of said digital video decoder unit in accessing pertinent motion vector information of said encoded digital video signal when stored in said memory, and said pan and scan offset address is usable by a display unit coupled to said digital video decoder unit for displaying decoded video data in pan and scan format.

3. The address generation engine of claim 2, wherein said address generation hardware generates from said vertical component and said horizontal component said macroblock write address, and wherein said vertical component comprises a row address of a reconstructed macroblock of a current picture being decoded and said horizontal component comprises a column address of the reconstructed macroblock of the current picture.

4. The address generation engine of claim 3, wherein said row address is defined as (SLICE-1) HSIZE and said column address is defined as a macroblock column in macroblock units.

5. The address generation engine of claim 2, wherein said address generation hardware generates from said vertical component and said horizontal component said motion compensation read address, and wherein said vertical component and horizontal component comprise addresses derived from motion vector information.

6. The address generation engine of claim 5, wherein said vertical component for generating said motion compensation read address comprises VERT_COMP·HSIZE in 2's complement, and said horizontal component comprises HOR_COMP in 2's complement in pixel units.

7. The address generation engine of claim 2, wherein said address generation hardware generates from said vertical component and said horizontal component said pan and scan offset address, and wherein said vertical component and said horizontal component comprise row and column address information, respectively, derived from pan and scan vectors in the encoded video signal to be decoded.

8. The address generation engine of claim 2, wherein said vertical component comprises VERT_OFFSET·HSIZE, and said horizontal component comprises HOR_OFFSET in pixel units.

9. The address generation engine of claim 1, wherein said address generation hardware comprises means for generating under control of said processor each of said macroblock write address, said motion compensation read address, and said pan and scan offset address with receipt at said address generation hardware of corresponding vertical components and horizontal components.

10. The address generation engine of claim 1, wherein said memory accommodates one or more of content scaled data, reduction scaled data and letterbox mode data and wherein said address generation hardware comprises means for at least one of content scaling, reduction scaling and letterbox mode scaling said vertical component and said horizontal component of said relative location information derived by said processor in generating either said macroblock write address or said pan and scan offset address.

11. The address generation engine of claim 1, wherein said address generation hardware further comprises an HSIZE register coupled in parallel with said row address register and said column address register, and wherein output of said HSIZE register, said row address register and said column address register is each coupled through a respective shifter to a different input of a multi-input adder, wherein an output of said adder comprises said at least one of the macroblock write address, the motion compensation read address, and the pan and scan offset address.

12. The address generation engine of claim 11, wherein said address generation hardware further comprises a state machine coupled to said shifters and to said multi-input adder, said state machine being controlled by said processor and controlling generation of said at least one of the macroblock write address, the motion compensation read address, and the pan and scan offset address.

13. The address generation engine of claim 12, wherein said processor provides address generation control signals to said state machine of said address generation hardware to control initiation and generation of said at least one of said macroblock write address, said motion compensation read address, and said pan and scan offset address.

14. The address generation engine of claim 13, wherein said processor and said address generation hardware comprise means for generating in said hybrid fashion the macroblock write address to memory for a macroblock to be reconstructed and then the motion compensation read address for use in reconstructing the macroblock.

15. A digital video decoder system for decoding an encoded digital video signal, said system comprising:

memory and a memory controller for temporarily storing the encoded digital video signal;

a variable length code (VLC) decoder coupled to said memory for decoding encoded data of the encoded digital video signal, thereby producing decoded data;

an inverse quantizer (IQ) coupled to the VLC decoder for dequantizing the decoded data to produce therefrom dequantized, decoded data;

a discrete cosine transform inverter (IDCT) coupled to the IQ for transforming the dequantized, decoded data from frequency domain to spatial domain, said spatial domain, dequantized decoded data including difference data;

a motion compensator (MC) and adder for receiving reference data from said memory and said difference data from the IDCT to form motion compensated pictures therefrom; and a hybrid address engine coupled to said MC and to a display unit of said digital video decoder system for providing addressing to said memory, said hybrid address engine comprising:

a processor coupled to memory to access the encoded data to be decoded, said processor having microcode for deriving from said encoded data relative location information including a vertical component and a horizontal component; and address generation hardware including a row address register and a column address register for receiving the vertical component and horizontal component, respectively, determined by said processor, said address generation hardware being coupled to and initiated by said processor and being configured to generate from said vertical component and horizontal component at least one of a macroblock write address, a motion compensation read address and a pan and scan offset address, wherein said at least one of said macroblock write address, said motion compensation read address and said pan and scan offset address is generated in hybrid fashion using said microcode of said processor and said address generation hardware.

16. The digital video decoder system of claim 15, wherein said memory comprises means for storing at least one of content scaled data, reduction scaled data and letterbox mode data, and wherein said address generation hardware comprises means for at least one of content scaling, reduction scaling and letterbox mode scaling said vertical component and said horizontal component of said relative location information derived by said processor in generating either said macroblock write address or said pan and scan offset address.

17. The digital video decoder system of claim 15, wherein said macroblock write address is usable for writing a decoded macroblock of data from said digital video decoder unit to said memory, said motion compensation read address is usable by said motion compensation unit in accessing pertinent motion vector information of said encoded data, and said pan and scan offset address is usable by said display unit of said digital video decoder system for displaying decoded video data in pan and scan format.

18. The digital video decoder system of claim 17, wherein said address generation hardware is usable to generate under control of said processor each of said macroblock write address, said motion compensation read address, and said pan and scan offset address.

19. The digital video decoder system of claim 18, wherein said address generation hardware includes a state machine and wherein said processor is coupled to and provides control signals to said state machine to control selection and generation of said at least one of said macroblock write address, said motion compensation read address, and said pan and scan offset address by said address generation hardware.

20. The digital video decoder system of claim 19, wherein said address generation hardware further comprises an HSIZE register coupled in parallel with said row address register and said column address register, and wherein output of said HSIZE register, said row address register and said column address register is each coupled through a respective shifter to a different input of a multi-input adder, wherein an output of said adder comprises said at least one of the macroblock write address, the motion compensation read address, and the pan and scan offset address, and wherein said state machine is coupled to said shifters and to said multi-input adder to control generation of said at least one of the macroblock write address, the motion compensation read address, and the pan and scan offset address.

21. The digital video decoder system of claim 20, wherein said shifter at the output of said HSIZE register is coupled to said multi-input adder across a 2-input MUX, and one input of said 2-input MUX comprises an output of said multi-input adder, and wherein said state machine is also coupled to said MUX for selecting between said two inputs.

22. The digital video decoder system of claim 15, wherein said macroblock write address, said motion compensation read address and said pan and scan offset address each comprise corresponding luminance and chrominance addresses to said memory.

23. In a digital video decoder system for decoding an encoded video signal, a hybrid address generation method for use within a digital video decoder unit for addressing memory of the digital video decoder system, said method comprising:

using microcode of a processor, coupled to access encoded data to be decoded by the digital video decoder unit, to generate therefrom relative location information including a vertical component and a horizontal component; and using address generation hardware coupled to the processor to generate from said vertical component and said horizontal component at least one of a macroblock write address, a motion compensation read address, and a pan and scan offset address, wherein said at least one of said macroblock write address, said motion compensation read address and said pan and scan offset address is generated in hybrid fashion using said microcode of said processor and said address generation hardware.

24. The hybrid address generation method of claim 23, wherein said using address generation hardware comprises initiating and operating said address generation hardware pursuant to address generation control signals received from said processor.

25. The hybrid address generation method of claim 24, wherein the macroblock write address is usable for writing a decoded macroblock of data from the digital video decoder unit to memory, the motion compensation read address is usable by a motion compensation unit of the digital video decoder unit in accessing pertinent motion vector information of the encoded data when stored in memory, and the pan and scan offset address is usable by a display unit coupled to the digital video decoder unit for displaying decoded video data in pan and scan format.

26. The hybrid address generation method of claim 23, wherein said memory comprises means for storing at least one of content scaled data, reduction scaled data and letterbox mode configured data, and wherein said using address generation hardware comprises using said address generation hardware for generating under control of said processor either the macroblock write address or pan and scan offset address for storage of decoded video data in memory as at least one of content scaled data, reduction scaled data and letterbox mode configured data.

27. The hybrid address generation method of claim 26, further comprising using said microcode of said processor and said address generation hardware to generate said macroblock write address for a macroblock to be reconstructed and then to generate said motion compensation read address for accessing pertinent motion vector information in the encoded data for use in reconstructing the macroblock.

28. The hybrid address generation method of claim 27, wherein said using microcode of the processor comprises employing said microcode to continue to parse the encoded data for motion vectors after initiating the address generation hardware to generate said macroblock write address, and wherein said using microcode further comprises using microcode of the processor to check for completion by said address generation hardware of said generating of the macroblock write address, and upon detecting said completion, for initiating said address generation hardware to generate said motion compensation read address for the motion vectors processed from the encoded data.

\* \* \* \* \*

UNITED STATES PATENT AND TRADEMARK OFFICE
CERTIFICATE OF CORRECTION

PATENT NO. : 5,963,222
DATED : October 05, 1999
INVENTOR(S) : Cheney et al.

It is certified that error appears in the above-identified patent and that said Letters Patent is hereby corrected as shown below:

Col. 11, line 44, delete "or pan" and replace with --For pan--.

Col. 12, line 6, delete "and pan" and replace with --and chroma pan--.

Col. 13, line 20, delete ", '1101'," and replace with --, '101',--.

Col. 14, in the equation for "CHROMINANCE", under "Fullsize, LB -3/4 Only" column, delete "(if Y - red)" and replace with --(if UV - Red)--.

Claim 4, Col. 21, line 41, delete "(SLICE-1) HSIZE" and replace with --(SLICE-1) • HSIZE--.

Signed and Sealed this

Fourth Day of April, 2000

Attest:

Q. TODD DICKINSON

Attesting Officer

Director of Patents and Trademarks